Figure 1:
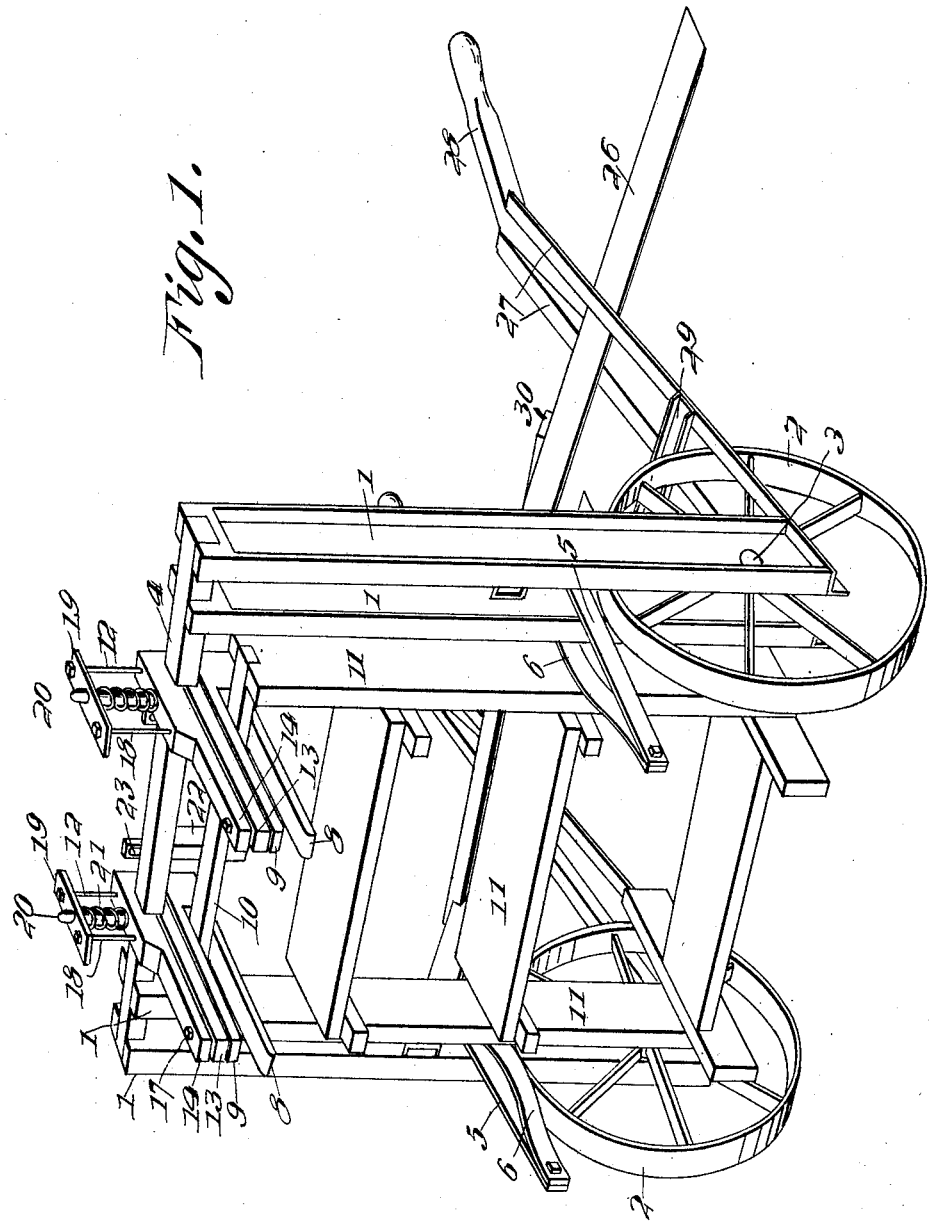

W. J. McCOY.
TRUCK.
APPLICATION FILED JAN. 19, 1910.

1,055,933.

Patented Mar. 11, 1913.

2 SHEETS—SHEET 1.

Witnesses
E. D. B. Brown.
M. E. Connor.

Inventor
Walter J. McCoy
by J. W. Suess, Attorney

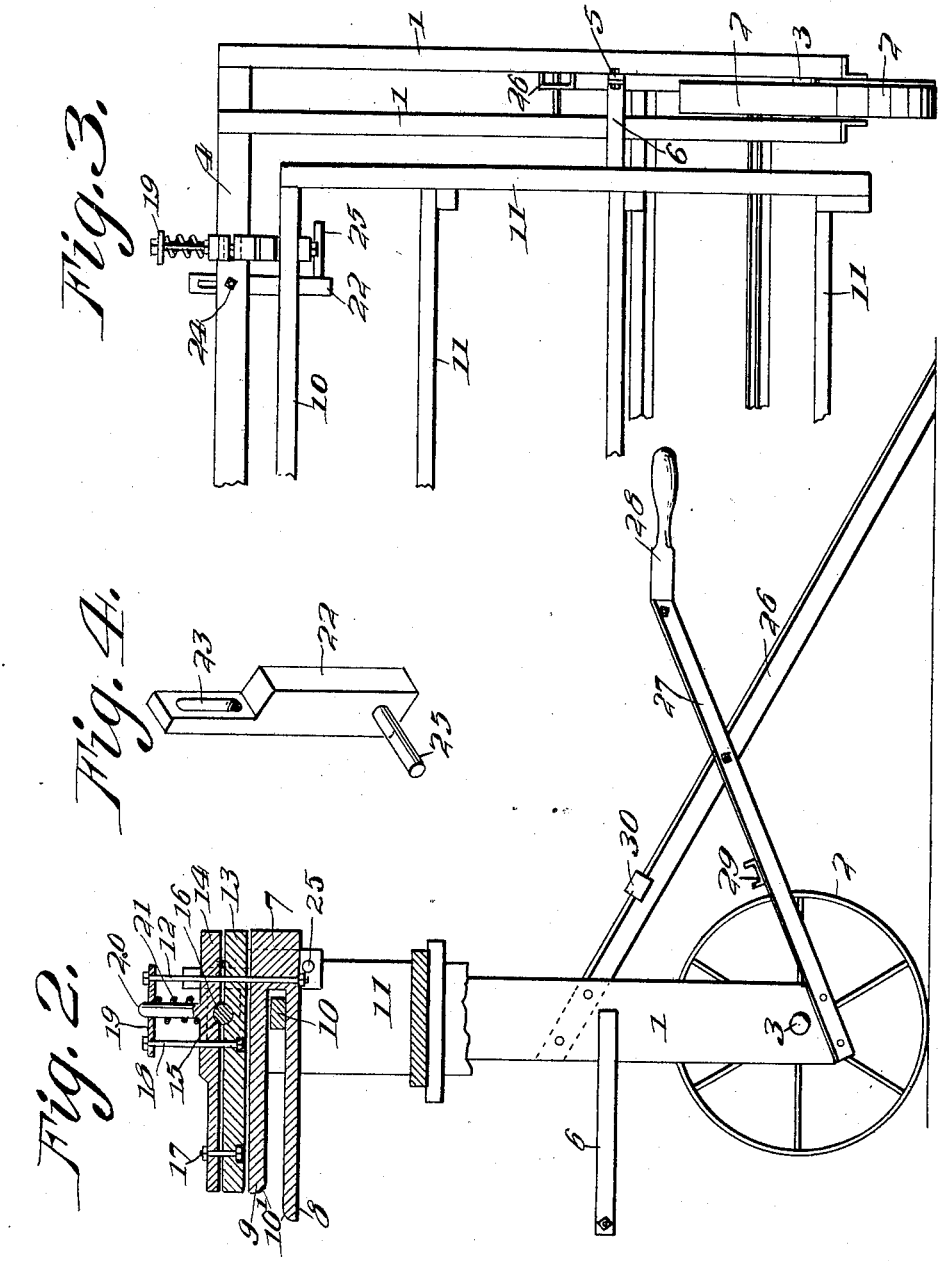

UNITED STATES PATENT OFFICE.

WALTER J. McCOY, OF SARPY COUNTY, NEBRASKA, ASSIGNOR OF ONE-HALF TO JOSEPH H. KOPIETZ, OF SOUTH OMAHA, NEBRASKA.

TRUCK.

1,055,933.  Specification of Letters Patent.  Patented Mar. 11, 1913.

Application filed January 19, 1910. Serial No. 538,861.

*To all whom it may concern:*

Be it known that I, WALTER J. McCoy, a citizen of the United States, residing in the county of Sarpy and State of Nebraska, have invented new and useful Improvements in Trucks, of which the following is a specification.

This invention relates to certain new and useful improvements in trucks and relates more particularly to trucks used for the conveyance of bricks, blocks formed of plastic material, and the like, and the object of the invention is to provide a truck of this character which will permit of the handling of the blocks and the like without breakage, or other mutilation.

A further object of the invention is to provide a truck which will pick up and carry the racks on which the wet or moist bricks or blocks are supported in a manner allowing of the truck discharging the racks so that the latter can be perfectly stored in a drying kiln in the smallest space possible.

Further objects of the invention are to provide means for carrying the racks so that a minimum of danger of breakage or other injury to the blocks is present, and to provide a truck possessed of simple and economical construction while yet preserving the necessary efficiency required by the uses to which the truck is put.

Further and other objects will be later set forth and manifested.

In the drawings: Figure 1 is a view in perspective of a truck constructed according to the present invention, showing a rack in its normal relation thereto, Fig. 2 is a vertical sectional view of Fig. 1 taken through one of the rack engaging members, Fig. 3 is a fragmentary front elevation, and Fig. 4 is a detail perspective view of the means for restricting the rearward movement of the rack engaging members.

The invention as at present contemplated includes a frame preferably constructed of sheet metal formed with spaced vertical side bars 1, the latter being arranged in pairs and receiving in the space between each pair the traction wheels 2 which latter may be of any desired character and are suitably journaled in any approved manner on the axles 3. The vertical side bars are connected at their upper ends by means of a connecting bar 4 which may be mortised into the upper ends of the side bars as illustrated in the drawings. Secured to the outermost of the pairs of side bars 1 are horizontally disposed arms 5 which arms support springs 6, the springs being bowed and having their free ends extending on the inner side faces of the innermost bars of the pairs of bars 1. The connecting bar 4 supports the rack engaging members, which latter are two in number, being arranged in spaced relation on the connecting bar 4. Each of the rack engaging members is composed of a jaw 7, the lower member 8 of which is prolonged so as to project beyond the free end of the upper member 9 as depicted in Fig. 2, the purpose of the prolongation of which is to facilitate engagement between the supporting bar 10 of the rack 11 and the jaw 7. As shown, each of the jaw members 8 and 9 have their mutually adjacent faces curved as at 10', so as to provide for easy insertion of the supporting bar 10 of the rack into the jaw 7. Through the rear end of the jaw 7 a bolt 12 is passed, the bolt being extended upwardly through the lower member 13 and the upper member 14 of the rack engaging device. The members 13 and 14 are provided on their adjacent inner faces with concave seats 15 which receive therebetween cylindrical portions 16 formed on the connecting bar 4 of the frame, whereby the rack engaging device is permitted to have an oscillatory movement with respect to the connecting bar 4 in an evident manner. At their front ends the members 13 and 14 are connected by a bolt 17, and at a point adjacent to the seats 15 a bolt 18 is passed through each of the members 13 and 14 and is extended upwardly to substantially the height to which the bolt 12 is extended, a plate 19 being formed with suitable perforations through which the bolts 12 and 18 pass, whereby the plate 19 may have sliding movement on such bolts. A stud 20 is carried by the upper member 14 and projects upwardly therefrom, the outer end of the stud passing through a suitable opening formed in the plate 19, there being a coil spring 21 which surrounds stud 20 and bears at one end against plate 19 and at its opposite end against the upper member 14, the spring 21 forcing the plate 19 upwardly and thereby providing a resilient support for the jaw 7. It will thus be observed that the rack engaging devices are resiliently mounted, and a certain obvious amount of play is allowed to the rack engaging devices when the truck is in motion, which will provide against jars or shocks being imparted to the bricks on the rack such as are ordinarily caused by any unevenness of travel of the truck.

In order to restrict the downward as well as the lateral movement of the rack when the truck is in motion, there are provided two back-bars 22, each of which is formed with a longitudinal slot 23 through which passes securing bolt 24, the latter being secured to the connecting bar 4 of the frame. Each of the back bars 22 carries an outwardly projecting pin 25 which is positioned to underlie and engage with the engaging device in a manner illustrated in Figs. 2 and 3, wherein it will be observed that the underside of jaw 7 engages with pin 25 which not only restricts the downward movement of the jaw 7 but also the oscillatory movement thereof. In picking up the racks, the jaw 7 it will be evident is engaged by the pin 25 preventing excessive tilting movement of the jaw.

To the lower ends of the bars or standards 1 are secured angle irons 27, and on the outer ends of these angle irons, handle bars 28 are provided for the purpose of allowing manual manipulation of the truck. A cross connecting bar 29 is secured to the angle irons 27. Bracing bars 26 are secured to the standards or side bars 1 and to the angle irons 27 and extend downwardly at an angle to engage with the surface on which the truck travels for purpose of supporting the truck in a standing position. A cross-bar 30 connects the bracing bars 26 as shown.

In operation it will be observed that since the engaging devices are capable of pivotal movement on the connecting bar 4, tilting movement imparted to the truck will cause a relative movement between bar 4 and the engaging devices until the jaw members 8 engage the pins 25. The truck is then moved so that the supporting bar 10 of the rack 11 is alined with the members 8 and 9 of the jaws 7, the truck being moved so that the bar 10 assumes the position in the jaws 7 as depicted in Figs. 1 and 2, after which the truck is returned to its normal position. As the weight of the rack 11 with the blocks thereon is now thrown on the connecting bolts 12, it will be observed that the latter will draw the plates 19 in a downward direction against the tension of springs 21, until the jaws 7 engage with the pins 25, which will thereby limit any further downward movement thereof. Even though the jaws 7 engage with pins 25, it will be obvious that the engaging devices, due to the springs 21, are permitted to have a slight oscillatory movement, whereby any unevenness of travel of the truck will not be imparted to the rack in a manner to effect the blocks carried thereby. The presence of the side springs 6, it will be observed, due to their engagement with the sides of the rack 11 prevent any sidewise or lateral motion of the rack. It will be obvious that after the rack has been engaged by the engaging devices and the truck has been restored to its normal position, that the sides of the rack 11 in their rearward movement will effect a slight compression of the springs 6 and be thereby held in a resilient manner as above set forth.

What is claimed as new is:—

1. In a truck, a frame, said frame including vertical standards and a top connecting bar, oscillatory devices mounted on the top connecting bar for engaging the top member of a rack, and horizontally arranged springs carried by the standards to engage the sides of the rack.

2. In a truck, a frame, said frame including vertical standards and a top connecting bar, spring supported oscillatory devices mounted on said top connecting bar engaging the top member of a rack, means to restrict the downward movement of said rack engaging devices, and to further restrict the oscillatory movements thereof, and spring means carried by the standards adapted to resiliently engage the sides of the rack.

3. In a truck, a frame composed of vertical standards and a top connecting bar, and rack engaging devices supported from the top bar so as to have an oscillatory movement with respect thereto, said rack engaging devices being composed of upper and lower members arranged on opposite sides of the connecting bar and clamped thereto, and a jaw member resiliently supported from said upper and lower members.

4. In a truck, a frame composed of vertical standards and a top connecting bar, said bar being formed with circular portions, upper and lower members having seats receiving said circular portions and clamped thereto so as to be capable of having oscillatory movement, a stud projecting from the upper of said members, a coil spring surrounding the stud, a plate mounted to slide on the stud and being engaged by said spring, and a jaw member connected to said plate.

5. In a truck, a frame composed of vertical standards and a top connecting bar, said bar being formed with circular portions, upper and lower members having seats receiving said circular portions and clamped thereto so as to be capable of having oscillatory movement, a stud projecting from the upper of said members, a coil spring surrounding the stud, a plate mounted to slide on the stud and being engaged by said spring, a jaw member connected to said plate, and means to restrict the oscillatory and downward movement of the jaw, said means including a bar depending from the top connecting bar of the frame, and an outwardly projecting pin carried by the depending bar and arranged to underlie the jaw.

6. In a truck, a frame composed of vertical standards and a top connecting bar, said bar being formed with circular portions, upper and lower members having seats receiving said circular portions and clamped thereto for oscillatory movement, a stud projecting from the upper of said members, a coil spring surrounding the stud, a plate mounted to slide on the stud and being engaged by said spring, a jaw connected with said plate and adapted to engage the top member of a rack, means to restrict the oscillatory and downward movement of the jaw, said means including a bar depending from the top connecting bar of the frame, and an outwardly projecting pin carried by the depending bar and arranged to underlie the jaw, horizontally disposed arms carried by the vertical standards of the frame, and bowed springs secured to said arms and adapted to engage the sides of the rack.

7. A truck for carrying racks having a top bar, including a tiltable wheeled frame, and means carried by the frame to engage said bar, said means when the frame is tilted being capable of engagement with the bar and when the frame is restored to normal vertical position effecting a lifting of the rack, and horizontal bowed springs carried by the frame for engaging the sides of the rack, to cause the latter to move with the frame.

8. In a truck, a frame including sides and a top, rack engaging devices carried by the top of the frame, and a horizontal inwardly bowed spring member carried by each side of the frame, said members being disposed directly opposite each other.

9. In a truck, the combination of a frame including vertical standards and a top connecting bar, oscillatory devices mounted on said bar for engaging the top member of a rack, and means carried by said standards for engaging the sides of the rack.

10. In a truck, a tiltable supporting frame, rack engaging devices including spaced upper and lower jaw members carried by the frame and movably connected thereto so as to have an oscillatory movement with respect to same, whereby, when the frame is bodily tilted out of normal vertical position, said jaw members receive the top member of a rack in the space therebetween so that when the frame is restored to normal vertical position a lifting of the rack will be effected, and spring means for resiliently supporting said rack engaging devices.

11. In a truck for carrying racks, which racks include a top bar, a tiltable frame, and means carried by the frame to engage said top bar of the rack, said means including an oscillatory jaw to receive the top and bottom sides of the top bar of the rack to effect a lifting thereof by engagement with the bottom side of said bar, and means for resiliently supporting said jaw.

12. A truck for carrying racks, which racks include a top bar, a tiltable frame, and means capable of oscillatory movement carried by the frame to receive the top and bottom sides of said top bar of the rack, whereby when the truck is tilted said means will be engageable with the bottom side of the top bar of the rack to effect a lifting of the rack when the frame is restored to normal vertical position.

In testimony whereof I have hereunto set my hand in presence of two subscribing witnesses.

WALTER J. McCOY.

Witnesses:
HENRY C. MURPHY,
JOSEPH F. MURPHY.

Copies of this patent may be obtained for five cents each, by addressing the "Commissioner of Patents, Washington, D. C."